Patented June 9, 1942

2,285,843

UNITED STATES PATENT OFFICE 2,285,843

NITROGEN GENERATING CHEMICALS

Wendell V. Smith, Nutley, N. J., assignor to United States Rubber Company, New York, N. Y., a corporation of New Jersey No Drawing. Application December 13, 1939, Serial No. 308,957

5 Claims. (Cl. 23—104)

The present invention relates to chemicals, suitable as chemical blowing or gassing agents for generating or liberating nitrogen gas, and useful particularly for the making of gas-expanded rubber products of both the cellular and the sponge types.

An object of the invention is to obtain concentrated ammonium nitrite, in the fluid state as a concentrated aqueous solution, in the solid state as crystalline ammonium nitrite, and as the complex salt of zinc having the probable formula $Zn(NH_3)_2(NO_2)_2$. Other objects will be apparent from the following description.

Ammonium nitrite has heretofore been obtained by evaporating and subliming in vacuo concentrated solutions of a mixture of ammonium chloride and sodium or potassium nitrite (J. W. Mellor "A Comprehensive Treatise on Inorganic and Theoretical Chemistry"; 1928; Longmans, Green and Co., New York, vol. VIII, p. 470). This practice, involving interaction of the ammonium chloride and alkali metal nitrite to form ammonium nitrite and alkali-metal chloride, is relatively costly and the yield of the concentrate somewhat limited, the ammonium nitrite having a tendency to decompose as it is formed, thereby requiring its preparation under definitely controlled conditions.

It has now been found that by reacting ammonium sulphate distinct advantages are obtainable over ammonium chloride. By utilizing its greater solubility in an ammoniacal solution together with the lower solubility of sodium or potassium sulphate formed therefrom (compared to above sodium or potassium chloride), a more concentrated solution of ammonium nitrite may be prepared and a better separation of the ammonium nitrite solution from the other salt (alkali-metal sulphate) produced in the double decomposition reaction results. By using ammonium sulphate, the ammonium nitrite solution can be prepared sufficiently concentrated to permit crystallization of the ammonium nitrite from the solution by cooling with ice or other agency, as distinguished from crystallization by evaporation of the solution. The concentrated ammonium nitrite solution also provides a means of forming a new gassing agent useful for making gas-expanded rubber, and which is a solid complex zinc diammonia nitrite.

The present gassing agents liberate nitrogen which is a most useful gas for making expanded rubber products since it diffuses so slowly through rubber, compared with gases like carbon dioxide and ammonia, thereby preventing collapse of the rubber which is an important item in making cellular rubber. The new gassing agent, zinc diammonia nitrite, is associated with little or no sodium salts, and the rubber accordingly has better ageing properties and lower water absorption.

The following examples are given to illustrate the invention:

*Example A.*—Preparation of concentrated aqueous solutions of ammonium nitrite:

The method comprises treating solid ammonium sulfate and solid sodium nitrite, in the approximate ratio of 1 to 2 moles respectively, with water containing dissolved ammonia. The amount of water may be regulated to give a solution of the desired concentration. When these are mixed a double decomposition takes place, and in the presence of only a limited amount of water, two phases are present, a solid and a liquid phase. The solid phase is rich in sodium sulfate and the liquid phase is rich in ammonium nitrite. Thus, by separating the two phases, a solution consisting of water, ammonia, ammonium nitrite and a small amount of sodium sulfate is obtained. The ratio of sodium sulfate to ammonium nitrite in the solution is small if a limited amount of water is used in the preparation. Heat may be applied to the mixture before separating the two phases in order to hasten the double decomposition.

A specific example to illustrate this preparation is as follows (parts are by weight):

Mix:

| | Parts |
|---|---|
| Solid $(NH_4)_2SO_4$ | 37 |
| Solid $NaNO_2$ | 38.6 |
| Add 9% aqueous ammonia solution | 24.4 |

Heat to 60° C. and maintain at this temperature for one hour with occasional stirring. Separate the solid phase (principally $Na_2SO_4$) from the liquid phase by filtering. The liquid phase so obtained, which is the product of interest, is an ammoniacal water solution of ammonium nitrite containing sodium sulfate as an impurity. The ammonium nitrite concentration is between 50 and 60%, and the sodium sulfate about 10%.

*Example B.*—Preparation of solid ammonium nitrite (parts are by weight):

The method involves cooling an ammoniacal water solution of ammonium nitrite containing more than 40% ammonium nitrite (such as that described above) to a temperature low enough to cause a solid phase to form. This solid phase consists principally of ammonium nitrite and may be separated from the liquid phase by any suitable method such as filtering. The liquid phase may be used in preparation A in place of the ammoniacal water solution.

A specific example which illustrates this method is as follows: 100 parts of an ammoniacal 57% solution of ammonium nitrite containing sodium sulfate as an impurity (preparation described in Example A) is cooled to —2° C. to induce crystallization, 41 parts of solid phase being thus formed. The solid phase is 75% ammonium nitrite and the remainder sodium sulfate.

*Example C.*—Zinc diammonia nitrite (parts are by weight):

A concentrated solution of ammonium nitrite such as that described in Example A is treated with an amount of zinc oxide in excess of that necessary for the maintenance of a solid phase in equilibrium with the solution. A reaction takes place forming a new solid, zinc diammonia nitrite, the composition of which is expressed by the formula, believed to be as follows:

$$Zn(NH_3)_2(NO_2)_2$$

Too large a quantity of zinc oxide is to be avoided as it would only contaminate the solid product. The maximum quantity of zinc oxide which can be used without such contamination is determined by the original ammonium nitrite content of the solution and by the composition of the solution which is in equilibrium with the two solid phases, zinc diammonia nitrite and zinc oxide. This latter composition is a function both of temperature and of the initial free ammonia content.

A specific example which illustrates this preparation is as follows: To 100 parts of an ammoniacal 45% ammonium nitrite solution containing approximately 4½% of free ammonia, prepared as in Example A add 22.5 parts of zinc oxide. Stir for one hour to break up lumps of zinc oxide and thus bring about complete reaction. This produces 39 parts of the complex salt, zinc diammonia nitrite, as a solid phase which may be separated from the liquid phase by filtering. The liquid phase from this treatment contains about 29% ammonium nitrite. It can be enriched with respect to ammonium nitrite by using it in place of the ammoniacal solution in preparation Example A and the cycle repeated.

By starting with an ammonia solution as in Example A not substantially greater than 9%, very little ammonia is lost in preparing the ammonium nitrite solution, and the ammonia concentration of the resulting solution is such that a good yield of the product is obtained on the addition of the zinc oxide.

Chemical analysis of a sample of the zinc diammonia nitrite gives the following results:

| | Analysis | Theoretical based on formula $Zn(NH_3)_2(NO_2)_2$ |
|---|---|---|
| | *Percent* | *Percent* |
| Zinc oxide | 41.7 | 42.3 |
| Total nitrogen | 28.5 | 29.3 |
| Ammonia | 17.0 | 17.8 |

The actual analysis lies between the compositions expressed by the formulas $$Zn(NH_3)_2(NO_2)_2$$

and $$Zn(NH_3)_2(NO_2)_2.H_2O$$

but nearer the former.

Each of the ammonium nitrite preparations of Examples A, B and C, above, evolves gases, principally nitrogen and water, when heated. Therefore, each may be used in rubber as the gas-producing substance in forming expanded rubber articles (soft, elastic or hard), either of the closed-cell type (cellular rubber) or of the interconnecting cell type (sponge). The substance is incorporated into the rubber along with the other necessary and desirable compounding ingredients, and the rubber mix is subjected to the usual control treatments to produce cellular rubber or sponge. The rubber may be natural rubber or artificial rubber that has substantially the physical properties of natural rubber.

The present gassing agents may also be used, as chemical reagents, to introduce nitrogen into other chemicals.

Having thus described my invention, what I claim and desire to protect by Letters Patent is:

1. A process which comprises mixing ammonium sulphate with alkali metal nitrite in the ratio of approximately one molecular proportion of the sulphate to approximately two molecular proportions of the nitrite in ammoniacal water solution containing an amount of water only sufficient to maintain in solution most of the ammonium nitrite formed in the ensuing reaction but insufficient to maintain in solution the alkali-metal sulfate formed, and heating the mixture to cause the reaction to take place.

2. A process as set forth in claim 1 in which, after heating the mix and allowing the solid phase of alkali-metal sulfate to precipitate out, the ammoniacal solution of ammonium nitrite is separated from said solid phase, and cooled to a temperature sufficiently low to precipitate out the ammonium nitrite, and segregating said precipitate of ammonium nitrite from the mother liquor.

3. A process which comprises mixing ammonium sulphate with alkali metal nitrite in the ratio of approximately one molecular proportion of the sulphate to approximately two molecular proportions of the nitrite in ammoniacal water solution containing an amount of water only sufficient to maintain in solution most of the ammonium nitrite formed in the ensuing reaction but insufficient to maintain in solution the alkali-metal sulfate formed, and heating the mixture to cause the reaction to take place, with formation of ammonium nitrite in solution, and reacting the ammoniacal solution containing the ammonium nitrite in solution with zinc oxide to form a solid complex zinc diammonia nitrite.

4. A process which comprises reacting an ammoniacal solution of ammonium nitrite with zinc oxide, the amount of zinc oxide being in excess of that necessary for maintaining a solid phase in equilibrium with the solution.

5. The compound, zinc diammonia dinitrite having an analysis; zinc as oxide approximately 42.3 percent; total nitrogen approximately 29.3 percent; ammonia approximately 17.8 percent

WENDELL V. SMITH.